Patented June 6, 1944

2,350,523

UNITED STATES PATENT OFFICE 2,350,523

SALT-FORM AZO PIGMENT DYESTUFF AND COATING COMPOSITION MADE THEREFROM

Grady M. O'Neal, Chicago, Ill., assignor to The Sherwin-Williams Company, Cleveland, Ohio, a corporation of Ohio No Drawing. Application March 17, 1943, Serial No. 479,496

37 Claims. (Cl. 106—219)

The present invention relates generally to improvements in organic pigment dyestuffs, and in particular to salt forms of azo pigment dyestuffs and lakes having a soap substratum. It also relates to coating compositions containing such pigments and lakes.

The term "azo pigment dyestuff" includes pigments of both the salt and non-salt forms. Such pigments may be extended, as by substrata or by diluents, with organic and inorganic materials to obtain various effects. Organic materials commonly employed are various soaps, such as the rosinates, para, and fatty acid types. Inorganic materals are, for example, blanc fixe, aluminum hydrate, aluminum phosphate, magnesium carbonate, and others. Substrata are generally present in sizable amounts upwards by weight of 10 parts to as high as 100 parts of soap-forming acid to 100 parts of pigment, and occasionally in even greater amounts. Azo pigment dyestuffs containing the various extenders in such relatively large amounts are known as lakes, but for the purposes of the present invention lake-forms are considered as those having at least 10 parts of soap-forming acid to 100 parts of pigment, and non-lake forms are those having less or no extender. This definition is made because the art is not definite on the point.

This invention provides an improvement in the art of making salt-form azo pigment dyestuffs, and especially lakes, as described in U. S. Patent No. 1,772,300, issued to Allen & Siegel, and in the art as the same has been improved and modified by others. Siegel, in U. S. Patent No. 2,173,699, states that the process of said Patent No. 1,772,300 produces pigments of which the inks are short and buttery, where rosin soap is used as the substratum. He also states that certain other natural and synthetic materials (see U. S. Patents Nos. 2,013,074 to 2,013,077 inclusive, granted to Siegel, and U. S. Patents No. 2,013,090, No. 2,013,099 and No. 2,013,100, granted to Siegel et al.) may be substituted for the products of Allen & Siegel in U. S. Patent No. 1,772,300, with substantially identical results. Generally, the prior art has developed the manufacture of such pigments with a single soap, such as rosin or other organic soap substratum, incorporated into the final product before, during, or after the formation of the pigment. This has been done in various ways. In the case of the salt-forming azo pigment dyestuffs, a typical procedure for arriving at a salt-form of an azo pigment dyestuff is as follows:

The initial azo pigment dyestuff form is produced by diazotizing an amine and coupling the same to a color-forming component. The amine and the component for the pigment form are so chosen that the product of the coupling enables arrival at an insoluble salt form, such insoluble salt form being a pigment suitable for the customary usages, as in various coating composition vehicles. Metals other than the alkali metals are usually chosen to form the most insoluble salts. The product of the coupling is usually present as the sodium salt or as an acid dyestuff in the presence of sodium ion. Then the desired soluble salt precipitant is added and the dyestuff is so processed as to convert it to an insoluble salt-form. In the case of the coupling products that have relatively little water solubility before conversion, the initial start of the conversion to form the pigment or lake is commonly made at low temperatures, the mass being cold after the coupling, at from freezing temperatures to factory temperatures of approximately 15° to 25° C. Where a soap substratum is to be introduced to produce a lake, a considerable quantity of water-soluble rosin or other soap is added before converting to the desired insoluble salt-form. The amount of the metal salt necessary to convert to the desired insoluble salt form is also increased in quantity, these metals giving water-insoluble metallic soaps while also converting to the selected salt-form. The temperature of the slurry, consisting usually of the initial coupling product, soap, and selected precipitant, is then raised and held at an upper temperature for a predetermined period of time. All of this results in an optimum fixation and development of the fastness and tinctorial properties of the final salt-form of the azo pigment dyestuff or lake.

Some of the principal purposes of adding a soap substratum are to distend the full-strength pigment, and to brighten the shade. Also, the use of certain soap extenders serves to improve the film gloss of the pigment coating compositions, and to eliminate a characteristic metallic or bronze effect that exists with the same pigments without the substratum. To achieve these results lake-forms have been produced. However, such pigments, with or without the substratum, have highly objectionable features which greatly limit their use in pigment coating compositions, such as printing inks, paints, enamels, and the like, these objectionable features being a serious matter in the graphic arts. The pigments are in general difficult to grind or disperse into a given vehicle, and the coating compositions made therefrom possess these general qualities: they offer poor resistance to lithographic breakdown, as in the case of inks; they tend to set-up; and they possess only mediocre working properties. These defects make such pigments objectionable to the manufacturer of pigment coating compositions because of the difficulties connected with their processing; and to the coating composition user, because of the limitations that govern their application.

There are remedies for the above objections which apply well to finished pigments without the large quantities of rosin soap or other extenders used in forming a substratum, but these remedies do not give comparable results when applied to lake-type pigments. These remedies are the subject of my cofiled applications, Serial Nos. 479,495 and 479,498.

It is an object of the present invention to make the salt-forms of azo pigment dyestuffs having a soap substratum in such a way that the resulting pigments or lakes do not possess the said objectional features, but result in superior coating compositions.

It is a particular object of the invention to precipitate or convert the substratum and the pigment in two stages under conditions whereby a distinctive pigment product results, having all the advantages of salt-form lake pigments carrying the usual substratum, and yet lacking the disadvantages thereof.

It is also an object of the invention to employ a combination of at least two types of soaps as the substratum.

A further object of the invention is to employ a combination of particular types of soap which, when used together, produce still further advantages over the results obtained from the use of either type alone.

Various other objects and advantages will appear hereinafter from the following description and explanation of the invention.

Referring generally to the prior art procedure given above as a basis for comparison, the present invention differs therefrom in the novel manner of simultaneous precipitation or conversion of the soap and pigment. This has been done heretofore by adding to the water-soluble soap and the incompleted pigment dyestuff form (the strike or a slurry) all of the required precipitant metal salt, and then heating to effect the conversion. In such procedure, higher temperatures for the strike are desirably avoided in the beginning of the conversion, because some complex conversion takes place wherein a complete conversion to the desired metal salt form will not occur. For example, a substantial amount of sodium salt pigment is included in the final salt form, all of which should be, for example, barium salt. This is particularly true when attempting to convert a relatively insoluble sodium salt form of an azo pigment dyestuff to a different and more insoluble salt form. The color of the sodium salt pigment differs from other metal salt forms. A conversion resulting in mixed salt forms is, therefore, very undesirable, even though an acceptable color may be obtained from time to time. In such a conversion the proportion of the final fixed sodium salt in the product changes with slight changes of conditions, thereby making for difficulty in maintaining and establishing a fixed control of the color process.

The procedure of this invention results in the formation of some fixed sodium or like salt, but not nearly to the extent resulting from the prior art procedures. The lightened masstones resulting from the presence of a small amount of pigment as the fixed sodium salt can be corrected for by the use of a small percentage of foreign amines with respect to the total amount of the amine to be diazotized; or the coupling component may be substituted for by a small percentage of an isomer of that component, or other foreign material. All of this is well known to those skilled in the art and forms the subject matter of a number of patents in this field.

According to the present invention, the prior art procedure is changed. With or without dilution of the dyestuff strike or slurry to a greater volume, an addition of the desired water-soluble soap or soaps for forming the substratum is made. At this point a radical departure is made, which involves the addition of the strike or pigment slurry to a hot salt solution containing from 10% to 90% of the total amount of metal equivalent necessary completely to convert both the soluble soap or soaps and the incompleted pigment dyestuff form. Thereafter, the remaining portion of the needed equivalent of metal salt solution is appropriately added and the temperature of the mass is raised in order completely to fix and develop the pigment dyestuff or lake. Where there is no salt precipitant, but only hot water to receive the strike, the color is worthless. Where the 10% lower limit of the required precipitant salt is present in the hot water, the product is much lighter in masstone than the product resulting from the use of 50% to 75% of the total amount of necessary metal salt precipitant.

The above novel process requires no essentially new materials, although new combinations of soaps for the substratum are hereinafter disclosed, which produce still further improvement in pigments made by the process of the present invention. The essential features of my new process involve the use of a higher conversion temperature than is customary; an incomplete conversion that is carried out by adding the strike or slurry, containing the soap solution for the laking, to a heated precipitant salt solution; and then a second step to complete the precipitation and/or conversion; all different from the customary procedure of merely adding a precipitant solution to a strike or slurry containing a soap solution.

The temperature at which the first or incomplete step of the conversion occurs may vary from 40° C. to the boiling temperature, but, for uniformity of procedure and results, it is best controlled in the range from 70° to 80° C. Below 40° C. the pigment begins to lose the desired new qualities, presenting some of the same disadvantages as the pigments made by the old procedure. As the temperature approaches the boiling point, the resulting pigment shows an increasing content of the fixed sodium salt form, with a correspondingly greater variation in its quality.

The scope of the term "soap" is not clearly defined in the technical literature, and the term is loosely and often improperly employed. Since the present invention makes use of soaps, I have chosen to define them by defining the acids from which they are derived. For the purposes of this invention, the soap or soaps employed must be derived from certain classes of soap-forming acids, which are hereinafter defined as "rosinic acid" and "fatty type acid."

"Rosinic acid," as the term is used in describing the present invention, contemplates rosin and abietic acid; modifications of rosin, such as heat-modified rosin and solvent-extracted rosin; chemical derivatives of rosin, such as hydrogenated rosin or abietic acid; the complex soap-forming acids resulting from the condensation product of rosin or abietic acid with unsaturated aliphatic acids having up to, but not more than, two carboxyl groups, as described hereinafter; and other chemical derivatives of rosin or abietic acid. Soaps of the complex soap-forming acids resulting from such rosin or abietic acid condensation derivatives are the subject of my cofiled application, Serial No. 479,499.

The term "fatty type acid," for the purposes of the present invention, contemplates: (1) the various $\alpha,\beta$-unsaturated aliphatic acids having up to, but not more than, two carboxyl groups, such as maleic acid, crotonic acid, acetylene dicarboxylic acid, citraconic acid, and the like, which are capable of being condensed with rosin or abietic acid by the Diels-Alder reaction (described hereinafter, and also in more detail in my cofiled application Serial No. 479,499); (2) the saturated and unsaturated soap-forming aliphatic acids, which have at least 8 carbon atoms including a carboxyl group carbon in an open carbon chain, such as caprylic acid, ricinoleic acid, oleic acid, linolic acid, linolenic acid, palmitic acid, and the like; and (3) the soap-forming naphthenic acids, defined hereinafter, and others of a cycloaliphatic nature, each carboxyl group of which is attached to the cyclic carbon chain through at least one intermediate carbon atom so that each carboxyl group is part of an aliphatic side chain of at least two carbon atoms. By this last mentioned limitation, I intend to include in this third class of fatty type acids those cycloaliphatic compounds, such as naphthenic acids, in which the carboxyl group is part of an aliphatic radical having at least two carbon atoms (including the carboxyl group carbon) and is not attached directly to a carbon atom of a cyclic carbon chain, and to exclude and differentiate from such compounds as the "rosinic acids," defined above, in which the carbon atom of the carboxyl group of the rosin or abietic acid is attached directly to a carbon atom of a cyclic carbon chain.

It is well known that many of the fatty type acids in group (2) in the preceding paragraph, both saturated and unsaturated, are found as mixtures in vegetable oils and animal fats, principally in the form of glycerides. Among the vegetable oil acids which are useful in the present invention, for example, are those from the oils of perilla seed, soya bean, sunflower seed, corn, rapeseed, and linseed. A typical analysis of perilla oil acids, to illustrate one class, is as follows:

Nature of acid: | Percentage
--- | ---
Oleic | 4.0–10.5
Linolic | 33.0–44.0
Linolenic | 44.0–49.0
Palmitic (substantially) | 6.5– 8.0

The term "fatty type acid" includes in group (1) of the above definition certain short chain acids, such as maleic acid, which are not "soap-forming" acids as the latter term is generally understood. I wish to make it clear, therefore, that such acids, since they are not alone truly "soap-forming" when reacted to form a metal salt, are not contemplated by the expression "soap of a fatty type acid." However, they are "soap-forming" acids when chemically combined with rosin, and, therefore, are intended to be included as members of the group of "fatty type acids" useful for the purposes of the present invention. When chemically combined with rosin and suitably reacted with a metal, they enter into the formation of a soap which is both rosinic and fatty type acid in nature. Such complex acid soaps are included within the scope of the broad term "soap of soap-forming acid derived in part from 'rosinic acid' and in part from 'fatty type acid,'" and similar expressions.

According to "Richter's Organic Chemistry," vol. II (1939), page 64, "naphthenic acids" are defined essentially as follows: These mixed acids are secured from petroleum during the refining. They consist of saturated monocyclic acids of the general formula $C_nH_{2n-2}O_2$, which have been found to be alkylated carboxylic acids of the cyclopentane series up to $C_{12}H_{22}O_2$; of two paraffin-carboxylic acids $C_6H_{12}O_2$ and $C_7H_{14}O_2$; and some bicyclic compounds of the general formula $C_nH_{2n-4}O_2$ ranging from $C_{13}H_{22}O_2$ to $C_{22}H_{40}O_2$.

It has been found that the soaps of the rosinic acids possess particularly desirable qualities for use in the process of this invention. However, in many instances it has been found that still further beneficial results can be obtained by using a mixture of soaps of one or more rosinic acids and one or more fatty type acids. When using a combination of soaps of rosinic and fatty type acids, it is desirable that the amount of the latter type of acid not exceed the amount of the former.

It has also been found that the washing of the pigment or lake on filtration, as done heretofore, may advantageously be dispensed with. Thus, there is left in the pigment some salt electrolyte which necessarily exists in the solution from which the pigment dyestuff and soaps are converted or precipitated. This salt electrolyte may consist of salt formed during the coupling reaction, any excess salt precipitant added, and salt formed by the conversion step. The presence of some salt electrolyte in the pigment dyestuff improves the quality of the pigment or lake of the present invention for making superior coating compositions. This effect may be enhanced by adding salt electrolyte to the suspended pigment before, during, or after filtering it. While the original salt-form of the original pigment dyestuff or lake may be freed from water-soluble salt electrolyte, necessarily present after its initial formation, by filtering, washing, and then, without drying, resuspending it in water and adding any desired salt electrolyte, it is preferred that a portion of the medium in which the pigment and substratum are originally formed be retained.

The term "salt electrolyte" comprehends generally those salts which are water-soluble and substantially neutral when ionized in aqueous solution, in particular the water-soluble salts of the alkali metals and the alkali-earth metals. While salts of the strong mineral acids, such as hydrochloric and nitric, are most usually illustrated in the following examples, others have been employed, such as salts of weak organic acids (formic, acetic, citric, oxalic and others). Also, cations other than the alkali and alkali-earth metals have been used as salts of a variety of acids, such cations being iron, lead, zinc, manganese, copper and others. In general, the choice of the most efficient salt electrolyte for any particular application is best determined experimentally.

The invention is further explained by reference to the following examples in which parts are given by weight and all solutions are aqueous:

Example 1

Graphic Red Pigment—*Barium salt of the coupling of 2-naphthylamine-1-sulfonic acid with 2-naphthol (See Schultz, "Farbstofftabellen" (1931), No. 219).*—Into 300 parts of water, place 8.5 parts of sodium hydroxide and 43.9 parts of 2-naphthylamine-1-sulfonic acid (98.5% purity). With gentle warming, stir to solution. Cool to 0° C. by means of an ice addition. Then add 57 parts of 28% (by weight) hydrochloric acid. Diazotize at 0° to 2° C. with 13.8 parts of sodium nitrite to form a diazo. Separately dissolve 1.2 parts of sodium carbonate (anhydrous) in 150 parts of water, and to this add a solution of 225 parts of water, 8.9 parts of sodium hydroxide, and 27.9 parts of 2-naphthol to form the alkaline color-component solution. With the latter at 20° C., add to it the liquid containing the prepared diazo, thus striking the dyestuff, which is now present as the acid form in the presence of sodium ion in a medium at about 13° C. This is referred to as "the strike."

*Old conversion.*—To the strike at 13° C., add 21.6 parts of WW wood rosin, as the sodium salt in a 10% solution. Then add a solution of 300 parts of water and 29.8 parts of barium chloride ($BaCl_2.2H_2O$). Heat at the boiling temperature for 10 minutes, flood with cold water to 70° C.; filter; thoroughly wash; and dry.

*New conversion.*—To the strike at 13° C., add the following three aqueous soap solutions:

(a) 7.2 parts of WW wood rosin, as the sodium salt in a 10% solution;

(b) 7.2 parts of a maleic acid-rosin condensation product (prepared by condensing approximately 1 part of maleic anhydride with 6.8 parts of E wood rosin), as the sodium salt in a 10% solution;

(c) 7.2 parts of crude naphthenic acids, as the sodium salts in a 10% solution;

and then dilute with cold water to a 100% volume increase.

Separately prepare a solution at 70° to 80° C. of 1800 parts of water and 17.8 parts of barium chloride ($BaCl_2.2H_2O$). Add the soap-containing strike slowly, as required, to the heated salt solution while stirring and maintaining the temperature at 70° to 80° C. Upon completion of the slurry addition, flood with cold water to 55° C. Then add a solution of 120 parts of water and 12 parts of barium chloride ($BaCl_2.2H_2O$). Heat at the boiling tempertaure for 10 minutes, and flood with cold water to a temperature of 70° C. Add 12 parts of barium chloride ($BaCl_2.2H_2O$) dissolved in 120 parts of water. Stir for a short time, filter, do not wash, and then dry. 20 parts of such pigment are readily ground into 24 parts of No. 0 regular litho varnish (a bodied linseed oil) to make an improved ink.

*Discussion.*—The last addition of barium chloride is optional for the purpose of introducing additional salt electrolyte. The omission of washing is for the purpose of retaining a portion of this and other salt electrolyte (largely sodium chloride), which are present in the suspending liquid, and which are largely filtered away. The rosin of the old procedure is changed to a substantially equivalent amount of these soap-forming acids; rosin, a maleic acid-rosin condensation product, and naphthenic acids. The wood rosin of the old procedure may be retained, but additional improvement is obtained by the new acid substitutions, the total improvement from the use of my new procedure with my new acid substitutions being materially greater than that resulting from merely employing my new procedure. The functional amounts of barium chloride, for pigment conversion and substratum formation, are the same in the new and old procedures.

It is to be observed that the above example provides a pigment lake having present a water-insoluble metallic soap of a rosinic acid, a water-insoluble metallic soap of a fatty type acid, and a water-insoluble complex metallic soap of a compound which is both rosinic acid and fatty type acid. A pigment having this combination of soaps, rather than but one of such simple types, is of itself improved for the purpose of making inks. A further improvement results from the presence in the final pigment of the salt electrolyte and of any water-insoluble metallic soap. The effectiveness of salt electrolyte to give improved inks is, in some instances, greatly enhanced by the presence of a combination of soaps, one of which is derived from a fatty type of soap-forming acid. Salt electrolyte in the pigment or lake form pigment results in better wetting thereof when incorporating it into a vehicle, and also results in coating compositions having increased flow and, in the case of inks, improved lithographic breakdown resistance.

Where the stoichiometric amount of salt is to be calculated for effecting the conversion of a pigment without a soap, there is no difficulty. However, where water-soluble soap is present, the amount required is increased by an excess dependent upon the requirements of said soap. These requirements vary and are best determined experimentally. Thus, in Example 1, the total salt used in the joint conversions is 126% of that required for the pigment alone.

The reversal in operations from prior art, that is, the new step of adding the strike to the solution of the salt containing a deficiency of the precipitant cation, is of great practical significance. In the old cold conversion, as precipitant solution is added, it is used up, and this occurs under cold conditions at which the sodium ion is not active to enter into salt formation. In the old hot conversions, the sodium ion is much more active to enter into a salt conversion. Because it is advantageous for the present invention to employ a hot conversion, the mixing has been reversed. At the beginning of the conversion, the sodium ion is at a relatively very low concentration, while the pigment-forming ion is at a relatively high concentration. This is a reversal of the ratio existing when the old hot conversion method is used, and its effect is to repress the activity of the sodium ion.

The first step of the new conversion is incomplete and is followed by a later completing step. It is believed that, at the first point of the conversion, a changed pigment crystalline state is obtained by the temperature conditions and by the presence of the soluble soap or soaps that are unprecipitated. Be that as it may, the end result of the final conversion is a salt form of an azo pigment dyestuff lake, possessing all the advantages of the usual lake of this type, plus enhanced surface properties.

*Other coating compositions.*—By conventional methods the pigments or lakes of the present invention may be ground into a very long linseed oil-alkyd resin varnish vehicle, such as is commonly employed in making inks, to make a composition as follows:

| | Parts by weight |
|---|---|
| Pigment | 20 |
| Alkyd resin varnish vehicle of these characteristics: 100% non-volatile, Y to Z body on Gardner-Holdt scale, acid value no higher than 6, capable of infinite reduction with mineral spirit, and flash point over 500° F | 48 |

By conventional methods the pigments or lakes of the present invention may be ground into a medium length linseed oil-alkyd resin varnish vehicle, such as is employed in enamel manufacture, to make a composition as follows:

| | Parts by weight |
|---|---|
| Pigment | 20 |
| Alkyd resin varnish vehicle of these characteristics: 50% non-volatile, X to Z body on Gardner-Holdt scale, acid value of 3 to 5, specific gravity of 0.915, and all solvents are petroleum solvents | 48 |

By conventional methods the pigments or lakes of the present invention may be ground into a mineral oil type of varnish. To illustrate, the following composition is a printing ink:

| | Parts by weight |
|---|---|
| Pigment | 45 |
| Vehicle: | |
| No. 0 regular litho varnish | 1 |
| Paraffin oil having no naphthenic base, and 102 seconds viscosity at 100° F | 3 |
| (total) | 55 |

The coating compositions obtained by incorporating the pigment lake of Example 1 into the various vehicles as described above are outstanding with respect to their body and flow. In printing, this is of value because the inks flow readily from the fountain to the inking rollers, thereby enabling impressions to be made more smoothly and rapidly. When using the pigment lake of Example 1 in coating compositions, such as enamels, the user is enabled to incorporate higher percentages of the pigment lake into a given vehicle than has hitherto been possible without losing the desirable brush-out properties of the old type of coating compositions. Also, the feature of incorporating higher percentages of the pigments or lakes into a given vehicle enables a manufacturer of coating compositions, such as one making use of "toner base" inks, to have more freedom in formulating a specific ink composition. It has also been observed that coating compositions prepared from these pigments or lakes display much less set-up than the old type of products, which lessened set-up results in a reduction of skinning losses. In the case of inks, by reason of their more fluid condition, removal of the original "toner base" inks from the containers, and subsequent processing thereof for particular uses, are facilitated. This also makes for less ink loss.

EXAMPLE 2

GRAPHIC RED PIGMENT—*Calcium salt of the coupling of 2-naphthylamine-1-sulfonic acid with 2-naphthol. See Schultz, "Farbstofftabellen" (1931), No. 219.*—As in Example 1, diazotize (at 0° to 2° C.) the following materials to prepare a diazo:

| | Parts |
|---|---|
| Water | 363.0 |
| Sodium hydroxide | 10.2 |
| 98.5% 2-naphthylamine-1-sulfonic acid | 53.2 |
| Hydrochloric acid (28% by weight) | 68.7 |
| Sodium nitrite | 16.7 |

As in Example 1, separately prepare (at 20° C.) a solution composed of:

| | Parts |
|---|---|
| Water | 183.0 |
| Sodium carbonate (anhydrous) | 1.4 |
| Water | 273.0 |
| Sodium hydroxide | 10.8 |
| 2-naphthol | 33.7 |

Add the prepared diazo to the second solution to strike the color, giving a strike at about 13° C.

*Old conversion.*—To the strike at 13° C., add 42 parts of WW wood rosin, as the sodium salt in a 10% solution. Then add a solution consisting of 300 parts of water and 30 parts of calcium chloride ($CaCl_2.2H_2O$). Heat, boil 10 minutes, flood with cold water to 70° C., filter, thoroughly wash, and dry.

*New conversion.*—Flood the strike with cold tap water to increase the volume 100%, raising the temperature to about 17° C. Then add 31.5 parts of WW wood rosin and 10.5 parts hydrogenated wood rosin, each as the sodium salt, the first as a 10% soap solution and the second as a 5% soap solution.

Separately, at 70° to 80° C., prepare a solution of 2160 parts of water and 13 parts of calcium chloride ($CaCl_2.2H_2O$). Add the soap-containing strike slowly, as required, to the salt solution while maintaining the temperature at 70° to 80° C. Upon completion of the slurry addition, flood with cold water to 55° C. Then add a solution of 216 parts of water and 54 parts of calcium chloride ($CaCl_2.2H_2O$). Heat, boil 10 minutes, flood with cold water to a temperature of 70° C., filter, do not wash, and then dry.

*Discussion.*—It is to be noted that the amount of calcium chloride ($CaCl_2.2H_2O$) required for the pigment is 17.2 parts, and for the soaps, 10.1 parts, the soaps being calculated as entirely of abietic acid. Thus, the total amount of the salt precipitant used for the completed conversion is about 2.5 times the theoretical amount. This illustrates that the salt excess may be present during the completion of the conversion in order to provide excess salt electrolyte. The pigment may be washed so as to lose some or all of the salt electrolyte, nevertheless, without losing the improvements resulting from the combination of soaps and the change of procedure.

This example also serves to illustrate a soap combination quite different from that of Example No. 1, being in this instance one soap of rosin and a second soap of a chemically modified rosin. In general, the soap combinations for the purposes of this invention may vary over a wide range in view of the variety of soap-forming acids available.

EXAMPLE 3

LAKE RED C PIGMENT—*The barium salt of the coupling of 2-chloro-5-toluidene-4-sulfonic acid with 2-naphthol. See Schultz, "Farbstofftabellen" (1931), No. 195.*—As in Example 1, diazotize the following "suspension A" (at 0° to 2° C.) by adding "solution B," then add "solution C," all to prepare the desired diazo:

| Suspension A: | Parts |
|---|---|
| Water | 200.0 |
| Sodium carbonate (anhydrous) | 3.0 |
| 2-chloro-5-toluidene-4-sulfonic acid (100%) | 10.9 |
| Hydrochloric acid (28% by weight) | 14.4 |
| Solution B: | |
| Sodium nitrite | 3.5 |
| Water | 40.0 |

Solution C:
    Sodium acetate (NaC$_2$H$_3$O$_2$.3H$_2$O)____ 5.0
    Water_____ 50.0

Separately prepare, at 20° C. as in Example 1, a single suspension compounded of the following three solutions:

|  | Parts |
|---|---|
| Water | 200.0 |
| Hydrochloric acid (28% by weight) | 6.9 |
| Water | 60.0 |
| Sodium hydroxide | 2.1 |
| 2-Naphthol | 7.4 |
| Water | 120.0 |
| Sodium bicarbonate | 5.0 |

Add the prepared diazo to the said single suspension to strike the color, giving the dyestuff strike.

*Old conversion.*—To the strike, which is at about 13° C., add 3.6 parts of WW wood rosin, as the sodium salt in a 10% aqueous solution. To this add a solution of 30 parts of water and 7.7 parts of barium chloride (BaCl$_2$.2H$_2$O). Heat at the boiling temperature for 10 minutes, flood with cold water to 80° C., filter, thoroughly wash, and dry.

*New conversion.*—To the strike, which is at about 13° C., add these aqueous solutions: 1.2 parts of WW wood rosin, as the sodium salt in a 10% solution; 1.2 parts of a maleic acid-rosin condensation product, (same as in Example 1), as the sodium salt in a 10% solution; and 1.2 parts of crude naphthenic acids, as the sodium salts in a 10% solution.

Separately prepare, at 70° to 80° C., a solution of 460 parts of water and 4.6 parts of barium chloride (BaCl$_2$.2H$_2$O). Add the soap-containing strike slowly, as required, to the salt solution while maintaining the temperature at 70° to 80° C. Now flood with cold water to 55° C.

Upon completion of the said addition and flooding, add a solution of 40 parts of water and 3.1 parts of barium chloride (BaCl$_2$.2H$_2$O). Heat at the boiling temperature for 10 minutes. Flood with cold water to 80° C. Then add, as salt electrolyte, a solution of 15 parts of water and 1.5 parts of barium chloride (BaCl$_2$.2H$_2$O). Filter, do not wash, and then dry.

The amount of soap-forming acids for the substratum may vary within wide limits, but, for the intended results of the present invention, the amount of soap-forming acid may be from about 10 to about 100 parts, or more, for 100 parts of pigment salt when lakes are desired, and less otherwise.

The following references to "old pigment" are to a pigment made by the old conversion method. The references to "new pigment" are to a pigment made by the new conversion of Example 3.

*Grinding.*—When the new pigment is ground into a No. 0 regular litho varnish to make an ink, a much reduced milling time is employed to give the same degree of pigment dispersion as when the old pigment is employed.

*Flow.*—The ink resulting from the new pigment displays excellent flow properties; whereas, the ink from the old pigment is short and stiff.

*Setting-up.*—The ink resulting from the new pigment product displays a much lessened tendency to set or body up, than that resulting from the old pigment.

*Lithographic breakdown resistance.*—The ink prepared from the new pigment shows improved lithographic breakdown resistance over that prepared from the old pigment.

The improvements of the present invention appear to be several and independent, yet, when they are joined, they are compounded in effect, each enhancing the other. Thus, the use of a single soap by the new conversion gives an improved product over the same materials by the old conversion. The combinations, as illustrated by the triple combination of a rosin soap in conjunction with a soap of a maleic acid-rosin condensation product and a soap of a fatty type acid, and as illustrated by the dual combination of a rosin soap in conjunction with a chemically modified rosin-derivative soap, such as hydrogenated rosin, while using the new conversion, all give a still further improvement. The presence of salt electrolyte in the case of the product having only the rosin soap, shows an appreciable benefit, but there is a considerable improvement over this, where both the salt electrolyte and a combination of soaps are present. In one aspect, therefore, the invention is an improved process for making substratum pigments or lakes. It also provides a special improvement in the substratum when the substratum comprises a combination of a rosinic acid and a fatty type acid soap. And further, it provides an improved form of said special substratum for such pigments or lakes, when salt electrolyte is present.

The term "rosinic acid" has been defined heretofore; however, in order to further clarify one aspect of this definition it may be pointed out that "the complex soap-forming acids" are derived from the condensation product of rosin or abietic acid with unsaturated aliphatic acids having up to, but not more than, two carboxyl groups. In my cofiled application, Serial No. 479,499, previously referred to, the basic concept is the production of water-insoluble metallic soaps from complex soap-forming acids—obtained by chemically combining rosin or abietic acid with unsaturated aliphatic acids having up to, but not more than, two carboxyl groups. It has been shown in that application that the actual procedural route for arriving at these desired complex acids is capable of wide variation. In one example, a typical ethylene dicarboxylic acid, in the form of its anhydride, is condensed with rosin to give the complex soap-forming acid directly. In a second example, a typical mixture of unsaturated, long-chain, aliphatic, monocarboxylic acids that are common in drying oils is condensed (the glyceride esters of these unsaturated monocarboxylic acids being employed in this instance) with rosin to give a condensation-polymer glyceride ester, this ester being then saponified with alkali to give the desired complex soap-forming acids. It is possible to use other ester forms of these unsaturated aliphatic acids in effecting their condensation with rosin or abietic acid, and it is not necessary that these esters be those of unsaturated, long-chain, aliphatic, monocarboxylic acids. For example, it is possible to form the identical maleic acid-abietic acid condensation product obtained by reacting maleic anhydride with abietic acid by condensing instead, the dimethyl ester of maleic acid with abietic acid to give the ester adduct, and then subsequently saponifying the ester adduct with alkali. All of this is well known. In the case of linseed oil, which was employed in the second example just referred to and which is illustrative of one drying oil, two unsaturated aliphatic acids are mainly present—linolic or 9:12-octadecadienoic acid; and linolenic or 9:12:15-octadecatrienoic acid. Linolic acid is an unsaturated monocarboxylic acid of the general type, $$C_nH_{2n-3}COOH$$

and linolenic acid, an unsaturated monocarboxylic acid of the general type, $C_nH_{2n-5}COOH$. Hence, it is seen that a large number of complex soap-forming acids, capable of forming water-insoluble metallic soaps for the purposes of this invention, are available.

While the step of incorporating the soap-modified pigment or lake into a vehicle to form a coating composition has been set forth in detail in Example 1, it is to be understood that the pigment lakes of each of the examples are adapted for use in the various well known non-aqueous liquid vehicles to produce printing inks, paints, enamels, and the like, whether the vehicle is one which dries by oxidation, evaporation, penetration, gelation, or a combination of two or more of these drying processes. The invention not only concerns the process of incorporating the pigments into non-aqueous liquid vehicles, but also the new and improved compositions which result.

Where the pigments or lakes are sold in commerce as such, they are commonly dried as described in the examples above. However, where they are worked into compositions with vehicles at the point of manufacture of the pigment or lake, it is not necessary to dry them as described. The wet cake from filtering the pigment or lake, either washed or not, may be flushed into the vehicles by well known procedures. The soaps of the present invention act also as flushing agents to aid in such manipulation. The water of the cake breaks out into a separable layer in the usual manner, leaving the vehicle with the pigment or lake and soap or soaps therein, and salt electrolyte also, where sufficient of this has been present initially, or has been added, as for example to the mass to be flushed. The pigment lake described in Example 1 has been used in this way with a No. 0 regular litho varnish, and also with a vehicle consisting essentially of mineral oil.

Whereas preparation of the prior art salt-forms of azo pigment dyestuff lakes results in a distended color and a brightened shade, along with a bettered film gloss and the elimination of the metallic bronze effect that exists in many of the coating compositions made therefrom, it is to be noted that the process of the present invention accomplishes all of this and, in addition, the entirely new results hereinbefore discussed. My invention involves a novel manner of precipitation and/or conversion of the azo pigment dyestuff or lake, with or without a special type of soap substratum, and also with or without salt electrolyte, though use of both of these variations is preferred. These variations, employed singly or in combination, result in azo pigment dyestuffs or lakes having particle surfaces that present controlled properties for manufacturing improved coating compositions.

In the foregoing examples, only the use of an original strike, containing initially an incompleted pigment form has been illustrated in the conversion process of this invention. It is also possible to employ an original strike which contains a water-soluble soap that was present during the coupling formation of the incompleted azo pigment dyestuff form, although such use is not always advantageous. Likewise, where the term "pigment slurry" is used, it is meant that the original dyestuff strike is in a different state than that of its initial formation as an incompleted pigment form. Either it contains materials that were not present during the coupling formation of the dyestuff form, such as soaps for example; or the mother liquid of the initial dyestuff strike has been removed, as by a filtration, and the incompleted pigment form redispersed in water, as by agitation, to give an incompleted "pigment slurry" which may then have the desired soap or soaps added. While the formation of a slurry by this last enumerated possibility is not preferred, due to the extra processing operations and loss of salt electrolyte, nevertheless the novel conversion procedure of the present invention may be employed for such a slurry, if desired. Therefore, in view of the several possible procedural variations, the term "strike," when used alone in the attached claims, is employed in its generic sense and is intended to include within its scope both an "original strike" and a "slurry," as those terms have been defined above.

To those skilled in the art, it will be apparent that this invention is capable of much wider variation than has been illustrated herein by specific examples. The many possible variations in the nature of the particular fatty type acid, rosinic acid, and salt electrolyte employed, and in the selected conditions of the conversion method, enable the extension of this invention far beyond the examples illustrated. The invention, therefore, is not to be considered as limited to or by the examples or suggested changes set forth in the foregoing description. In the claims which follow, I intend to cover the full range of possible variations which would occur to one skilled in the art, from an understanding of the foregoing, as well as those variations specifically mentioned.

The present invention is specific to a more generic invention in this field, set forth and claimed in my cofiled application, Serial No. 479,493, and is a continuation in part of my previously filed copending applications, Serial Nos. 348,689 and 348,690, both filed July 31, 1940, and my copending application, Serial No. 427,920, filed January 23, 1942.

What I claim as my invention and desire to secure by Letters Patent is:

1. The method of making an azo pigment dyestuff composition which comprises providing in an aqueous liquid a dyestuff strike of a salt-forming type of azo pigment dyestuff in incompleted pigment form, prepared from a diazotized amine and a coupling agent, said aqueous liquid also containing water-soluble soap of soap-forming acid capable of forming water-insoluble metallic soap with precipitating metal cations to be used to convert said incompleted pigment form to completed pigment salt form, adding said aqueous liquid to a liquid solution providing from 10% to 90% of the total amount of the said cations necessary completely to convert said incompleted pigment form to said completed pigment form and completely to convert said soluble soap to water-insoluble metallic soap, while maintaining the temperature of the combined liquids between about 40° C. and the boiling temperature thereof, then adding material providing more of said cations in quantity at least sufficient to complete the pigment conversion and the insoluble-soap formation, and heating the resulting mass to complete the pigment conversion.

2. The method of making an azo pigment dyestuff lake which comprises providing in an aqueous liquid a dyestuff strike of a salt-forming type of azo pigment dyestuff in incompleted pigment form, prepared from a diazotized amine and a coupling agent, said liquid also containing water-soluble soap of soap-forming acid capable of forming water-insoluble metallic soap with precipitating metal cations to be used to convert said incompleted pigment form to completed pigment salt form, there being from 10 to 100 parts by weight of said soap-forming acid to 100 parts by weight of the completed pigment salt to be formed, adding said aqueous liquid to a liquid solution providing from 10% to 90% of the total amount of the said cations necessary completely to convert said incompleted pigment form to said completed pigment form and completely to convert said soluble soap to said water-insoluble metallic soap, while maintaining the temperature of the combined liquids between about 40° C. and the boiling temperature thereof, then adding material providing more of said cations in quantity at least sufficient to complete the pigment conversion and the insoluble soap formation, and heating the resulting mass to complete the pigment conversion.

3. The method of making an azo pigment dyestuff composition which comprises forming in an aqueous liquid a dyestuff strike of a salt-forming type of azo pigment dyestuff in incompleted pigment form from a diazotized amine and a coupling agent, providing aqueous liquid containing said strike and water-soluble soap of soap-forming acid capable of forming water-insoluble metallic soap with precipitating metal cations to be used to convert said incompleted pigment form to completed pigment salt form, adding the liquid containing said strike and said soluble soap to a liquid salt solution providing from 10% to 90% of the total amount of the said cations necessary completely to convert said incompleted pigment form to said completed pigment form and completely to convert said soluble soap to said water-insoluble metallic soap, while maintaining the temperature of the combined liquids between about 40° C. and the boiling temperature thereof, then adding material providing more of said cations in quantity at least sufficient to complete the pigment conversion and the water-insoluble soap formation, and heating the resulting mass to complete the pigment conversion.

4. The method of making an azo pigment dyestuff lake which comprises forming in an aqueous liquid a dyestuff strike of a salt-forming type of azo pigment dyestuff in incompleted pigment form from a diazotized amine and a coupling agent, providing aqueous liquid containing said strike and water-soluble soap of soap-forming acid capable of forming water-insoluble metallic soap with precipitating metal cations to be used to convert said incompleted pigment form to completed pigment salt form, there being from 10 to 100 parts by weight of said soap-forming acid to 100 parts by weight of the completed pigment salt to be formed, adding the liquid containing said strike and said soluble soap to an aqueous salt solution providing from 10% to 90% of the total amount of the said cations necessary completely to convert said incompleted pigment form to said completed pigment form and completely to convert said soluble soap to said water-insoluble form, while maintaining the temperature of the combined liquids between about 40° C. and the boiling temperature thereof, then adding salt providing more of said cations in quantity at least sufficient to complete the pigment conversion and the water-insoluble soap formation, and heating the resulting mass to complete the pigment conversion.

5. The process of claim 1 in which the strike in said aqueous liquid is an original strike, whereby salt electrolyte resulting from formation of the strike is present therein, said process of said claim being followed by separation of the resulting completed pigment and insoluble soap from the liquid in such manner as to retain a small amount of salt electrolyte with the pigment and soap.

6. The process of claim 2 in which the strike in said aqueous liquid is an original strike, whereby salt electrolyte resulting from formation of the strike is present therein, the process of said claim being followed by separation of the resulting completed pigment and insoluble soap from the combined liquids in such manner as to retain a small amount of salt electrolyte with the pigment and soap.

7. The process of claim 3 in which the water-soluble soap with the strike is metallic soap, the metal of which, together with the anion of the salt employed for the pigment and soap conversions, provides salt electrolyte in the combined liquids, the process of said claim being followed by separation of the resulting pigment and insoluble soap from the liquid in such manner as to retain a small amount of salt electrolyte with the pigment and soap.

8. The process of claim 4 in which the soluble soap added to the strike is metallic soap, the metal of which, together with the anion of the salt employed for the pigment and soap conversions, provides salt electrolyte in the combined liquids, the process of said claim being followed by separation of the resulting pigment and insoluble soap from the liquid in such manner as to retain a small amount of salt electrolyte with the pigment and soap.

9. The process of claim 3 in which the salt last added is employed in excess of the amount required for completion of the pigment and soap conversion, the process of said claim being followed by separation of the resulting pigment and insoluble soap from the combined liquids in such manner as to retain a small amount of salt electrolyte with the pigment and soap.

10. The process of claim 4 in which the salt last added is employed in excess of the amount required for completion of the pigment and soap conversions, the process of said claim being followed by separation of the resulting pigment and insoluble soap from the combined liquids in such manner as to retain a small amount of salt electrolyte with the pigment and soap.

11. The method of making an azo pigment dyestuff composition which comprises forming a dyestuff strike of a salt-forming type of azo pigment dyestuff in incompleted pigment form from a diazotized amine and a coupling agent, providing aqueous liquid containing said strike and water-soluble soap of soap-forming acid derived in part from "rosinic acid" and in part from "fatty type acid," adding said aqueous liquid to a liquid solution providing from 10% to 90% of the total amount of the metal cations necessary completely to convert said incompleted pigment form to said completed pigment form and completely to convert said soluble soap to water-insoluble metallic soap, while maintaining the temperature of the combined liquids between about 40° C. and the boiling temperature thereof, then adding material providing more of said cations in quantity at least sufficient to complete the said pigment conversion and the said insoluble soap formation, and heating the resulting mass to complete the pigment conversion.

12. The method of making an azo pigment dyestuff composition which comprises forming a dyestuff strike of a salt-forming type of azo pigment dyestuff in incompleted pigment form from a diazotized amine and a coupling agent, providing aqueous liquid containing said strike and water-soluble soap of soap-forming acid derived in part from "rosinic acid" and in part from "fatty type acid," adding said aqueous liquid to a liquid solution containing salt providing from 10% to 90% of the total amount of the metal cations necessary completely to convert said incompleted pigment form to said completed pigment form and completely to convert said soluble soap to water-insoluble metallic soap, while maintaining the temperature of the combined liquids between about 40° C. and the boiling temperature thereof, then adding salt providing more of said cations in quantity at least sufficient to complete the said pigment conversion and the said insoluble soap formation, and heating the resulting mass to complete the pigment conversion.

13. The method of forming an azo pigment dyestuff lake which comprises forming a dyestuff strike of a salt-forming type of azo pigment dyestuff in incompleted pigment form from a diazotized amine and a coupling agent, providing aqueous liquid containing said strike and water-soluble soap of soap-forming acid derived in part from "rosinic acid" and in part from "fatty type acid," there being from 10 to 100 parts by weight of total soap-froming acid to 100 parts by weight of the completed pigment salt to be formed, adding said aqueous liquid to a liquid solution providing from 10% to 90% of the total amount of the metal cations necessary completely to convert said incompleted pigment form to said completed pigment form and completely to convert said soluble soap to water-insoluble metallic soap, while maintaining the temperature of the combined liquids between aobut 40° C. and the boiling temperature thereof, then adding material providing more of said cations in quantity at least sufficient to complete the said pigment conversion and the said insoluble soap formation, and heating the resulting mass to complete the pigment conversion.

14. The method of making an azo pigment dyestuff composition which comprises forming a dyestuff strike of a salt-forming type of azo pigment dyestuff in incompleted pigment form from a diazotized amine and a coupling agent, providing aqueous liquid containing said strike and water-soluble soap of soap-forming acid derived in part from "rosinic acid" and in part from "fatty type acid," the said "fatty type acid" being present in quantity not exceeding the quantity of said "rosinic acid," adding said aqueous liquid to a liquid solution providing from 10% to 90% of the total amount of the metal cations necessary completely to convert said incompleted pigment form to said completed pigment form and completely to convert said soluble soap to water-insoluble metallic soap, while maintaining the temperature of the combined liquids between about 40° C. and the boiling temperature thereof, then adding material providing more of said cations in quantity at least sufficient to complete the said pigment conversion and the said insoluble soap formation, and heating the resulting mass to complete the pigment conversion.

15. The method of making an azo pigment dyestuff lake which comprises forming a dyestuff strike of a salt-forming type of azo pigment dyestuff in incompleted pigment form from a diazotized amine and a coupling agent, providing aqueous liquid containing said strike and water-soluble soap of soap-forming acid derived in part from rosinic acid and in part from "fatty type acids," the said "fatty type acid" being present in quantity not exceeding the quantity of said rosinic acid, the total amount of said soap-forming acids being from 10 to 100 parts by weight to 100 parts by weight of the completed pigment salt to be formed, adding said aqueous liquid to a liquid solution providing from 10% to 90% of the total amount of the metal cations necessary completely to convert said incompleted pigment form to said completed pigment form and completely to convert said soluble soap to water-insoluble metallic soap, while maintaining the temperature of the combined liquids between about 40° C. and the boiling temperature thereof, then adding material providing more of said cations in quantity at least sufficient to complete the said pigment conversion and the said insoluble soap formation, and heating the resulting mass to complete the pigment conversion.

16. The process of claim 11 in which the strike in said aqueuos liquid is an original strike, whereby salt electrolyte resulting from formation of the strike is present therein, the process of said claim being followed by separation of the resulting completed pigment and insoluble soap from the combined liquids in such manner as to retain a small amount of salt electrolyte with the pigment and soap.

17. The process of claim 12 in which the water-soluble soap is metallic soap the metal of which, together with the anion of the salt employed for the pigment and soap conversions, provides salt electrolyte in the combined liquids, said process of said claim being followed by separation of the resulting completed pigment and insoluble soap from the combined liquids in such manner as to retain a small amount of salt electrolyte with the pigment and soap.

18. The process of claim 12 in which the salt last added is employed in excess of the amount required for the pigment and soap conversion, said process of said claim being followed by separation of the resulting completed pigment and insoluble soap from the combined liquids in such manner as to retain a small amount of salt electrolyte with the pigment and soap.

19. A salt-form azo pigment dyestuff composition resulting from the process of claim 1.

20. A salt-form azo pigment dyestuff lake resulting from the process of claim 2.

21. A salt-form azo pigment dyestuff composition resulting from the process of claim 11.

22. A salt-form azo pigment dyestuff lake resulting from the process of claim 13.

23. A salt-form azo pigment dyestuff composition resulting from the process of claim 1, and containing a small amount of salt electrolyte in intimate association therewith.

24. A salt-form azo pigment dyestuff lake resulting from the process of claim 2, and containing a small amount of salt electrolyte in intimate association therewith.

25. A salt-form azo pigment dyestuff composition resulting from the process of claim 11, and containing a small amount of salt electrolyte in intimate association therewith.

26. A salt-form azo pigment dyestuff lake resulting from the process of claim 13, and containing a small amount of salt electrolyte in intimate association therewith.

27. The process of claim 1, followed by separating the resulting pigment-soap composition from the liquid in which it is contained, and by incorporating said composition into a non-aqueous liquid vehicle.

28. In the method of making a coating composition, the step of incorporating into a non-aqueous liquid vehicle a soap-modified azo pigment dyestuff salt produced by the process of claim 1.

29. In the method of making a coating composition, the step of simultaneously incorporating an azo pigment dyestuff composition produced by the process of claim 1 and a small amount of salt electrolyte into a non-aqueous liquid vehicle.

30. In the method of making a coating composition, the step of incorporating into a non-aqueous liquid vehicle an azo pigment dyestuff composition produced by the process of claim 1 and having a small amount of salt electrolyte intimately associated therewith.

31. In the method of making a coating composition, the step of incorporating into a non-aqueous liquid vehicle an azo pigment dyestuff lake produced by the process of claim 2.

32. In the method of making a coating composition, the step of simultaneously incorporating an azo pigment dyestuff lake produced by the process of claim 2 and a small amount of salt electrolyte into a non-aqueous liquid vehicle.

33. In the method of making a coating composition, the step of incorporating into a non-aqueous liquid vehicle an azo pigment dyestuff lake produced by the process of claim 2 and having a small amount of salt electrolyte intimately associated therewith.

34. In the method of making a coating composition, the step of incorporating into a non-aqueous liquid vehicles an azo pigment dyestuff composition produced by the process of claim 11.

35. In the method of making a coating composition, the step of incorporating into a non-aqueous liquid vehicle an azo pigment dyestuff composition produced by the process of claim 11 and having a small amount of salt electrolyte intimately associated therewith.

36. In the method of making a coating composition, the step of incorporating into a non-aqueous liquid vehicle an azo pigment dyestuff lake produced by the process of claim 13.

37. In the method of making a coating composition, the step of incorporating into a non-aqueous liquid vehicle an azo pigment dyestuff lake produced by the process of claim 13 and having a small amount of salt electrolyte intimately associated therewith.

GRADY M. O'NEAL.